(12) United States Patent
Thiel

(10) Patent No.: US 9,242,582 B2
(45) Date of Patent: Jan. 26, 2016

(54) FITTING FOR A VEHICLE SEAT

(75) Inventor: Peter Thiel, Remscheid (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 373 days.

(21) Appl. No.: 13/321,368

(22) PCT Filed: Aug. 2, 2010

(86) PCT No.: PCT/EP2010/004719
§ 371 (c)(1),
(2), (4) Date: Nov. 18, 2011

(87) PCT Pub. No.: WO2011/023279
PCT Pub. Date: Mar. 3, 2011

(65) Prior Publication Data
US 2012/0074752 A1   Mar. 29, 2012

(30) Foreign Application Priority Data
Aug. 28, 2009  (DE) .......................... 10 2009 039 648

(51) Int. Cl.
*B60N 2/225* (2006.01)
(52) U.S. Cl.
CPC .................................. *B60N 2/2252* (2013.01)
(58) Field of Classification Search
CPC .................................................. B60N 2/2252
USPC .................... 297/362; 475/180; 474/462, 640
See application file for complete search history.

(56) References Cited

U.S. PATENT DOCUMENTS

| | | | |
|---|---|---|---|
| 3,982,445 A * | 9/1976 | Rouverol ........................ 74/462 |
| 4,302,047 A | 11/1981 | Esser | |
| 5,030,184 A * | 7/1991 | Rennerfelt ..................... 475/162 |
| 5,188,571 A | 2/1993 | Boltze et al. | |
| 5,634,689 A | 6/1997 | Putsch et al. | |
| 6,799,806 B2 | 10/2004 | Eppert et al. | |
| 8,016,356 B2 * | 9/2011 | Mitsuhashi et al. .......... 297/366 |

(Continued)

FOREIGN PATENT DOCUMENTS

| | | |
|---|---|---|
| DE | 28 49 542 C2 | 11/1982 |
| DE | 41 38 913 C1 | 6/1993 |

(Continued)

OTHER PUBLICATIONS

H.E. Merrit, "Gears", 1943, Pitman, London, XP002650579, pp. 59-69.

*Primary Examiner* — David R Dunn
*Assistant Examiner* — Timothy J Brindley
(74) *Attorney, Agent, or Firm* — McGlew and Tuttle, P.C.

(57) ABSTRACT

A fitting (10), in particular for a motor vehicle seat, includes a first fitting part (11), on which a ring gear (17) is formed, a second fitting part (12), on which a gear (16) is formed, which meshes with the ring gear (17), whereby the two fitting parts (11, 12) are in a transmission connection with each other, and a rotatably mounted, revolving eccentric for driving a relative rolling motion of the gear (16) and the ring gear (17). The eccentric is driven by a carrier, wherein during said rolling motion, a tooth flank (16d) of a tooth (16a) of the gear (16) contacts a tooth flank (17d) of a tooth (17a) of the ring gear (17) at a pitch point (W). The radius of curvature (K1) of the tooth flank (16d) of the tooth (16a) of the gear (16) at the pitch point (W) and the radius of curvature (K2) of the tooth flank (17d) of the tooth (17a); of the ring gear (17) at the pitch point (W) are at least approximately equal.

20 Claims, 3 Drawing Sheets

(56) References Cited

U.S. PATENT DOCUMENTS

| | | | | |
|---|---|---|---|---|
| 8,033,606 B2 * | 10/2011 | Mitsuhashi | ............... | 297/362 |
| 8,460,145 B2 * | 6/2013 | Mitsuhashi | ............... | 475/162 |
| 8,931,843 B2 * | 1/2015 | Schuler | ............... | B60N 2/2252 297/367 R |
| 2005/0044986 A1 * | 3/2005 | Ishikawa | ............... | F16H 55/0833 74/640 |
| 2006/0220430 A1 * | 10/2006 | Baloche Faurecia | ............... | 297/362 |
| 2007/0032332 A1 | 2/2007 | Ito | | |

FOREIGN PATENT DOCUMENTS

| | | |
|---|---|---|
| DE | 44 36 101 A1 | 6/1995 |
| DE | 40 34 843 C2 | 4/1997 |
| DE | 10 2009 039 648 B3 | 2/2011 |
| JP | S55-68328 A | 5/1980 |
| WO | WO 2008/152829 * | 12/2008 |

\* cited by examiner

FITTING FOR A VEHICLE SEAT

CROSS REFERENCE TO RELATED APPLICATIONS

This application is a United States National Phase application of International Application PCT/EP2010/004719 and claims the benefit of priority under 35 U.S.C. §119 of German Patent Application DE 10 2009 039 648.9 filed Aug. 28, 2009, the entire contents of which are incorporated herein by reference.

FIELD OF THE INVENTION

The invention relates to a fitting for a vehicle seat, in particular for a motor vehicle seat, having a first fitting part on which is formed a toothed ring, a second fitting part on which is formed a toothed wheel which meshes with the toothed ring, as a result of which the two fitting parts are in gear connection with each other, a rotatably supported circumferential eccentric, driven by a driver, for driving a relative rolling movement of the toothed wheel and the toothed ring.

BACKGROUND OF THE INVENTION

A fitting of this type is known from DE 40 34 843 C2, such fitting serving as a backrest adjusting mechanism. The tooth flanks of toothed wheel and toothed ring which come to bear against one another are configured according to an evolvent toothing.

SUMMARY OF THE INVENTION

An object of the invention is to create a fitting of the type mentioned in the introduction with an alternative toothing.

According to the invention, a fitting is provided comprising a first fitting part with a toothed ring, a second fitting part with a toothed wheel which meshes with the toothed ring to provide a gear connection, a rotatably supported circumferential eccentric and a driver. The eccentric is driven by the driver for driving a relative rolling movement of the toothed wheel and the toothed ring. During this rolling movement a tooth flank of a tooth of the toothed wheel bears against a tooth flank of a tooth of the toothed ring at a pitch point and a radius of curvature of the tooth flank of the tooth of the toothed wheel at the pitch point and the radius of curvature of the toothed flank of the tooth of the toothed ring at the pitch point are approximately identical.

Due to the fact that the radius of curvature of the tooth flank of the tooth of the toothed wheel at the pitch point and the radius of curvature of the tooth flank of the tooth of the toothed ring at the pitch point are at least approximately identical, a more extensive contact surface is possible, increasing the stability under load. A constant radius of curvature (circular-arc-shaped curvature) represents a simple geometry which is easy to manufacture and can be configured for different versions. Preferred geometric relations of the pitch point, of the center points of toothed wheel and toothed ring and of an instantaneous center of rotation improve the properties of this toothing.

The use of an eccentric epicyclic gear system in a fitting enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric which comprises, for example, two wedge segments braced apart by means of a spring, or a sickle-shaped member, is preferably supported, on its side opposing the slide bearing, for example on the inside, on a collar of the other fitting part.

The invention is explained in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
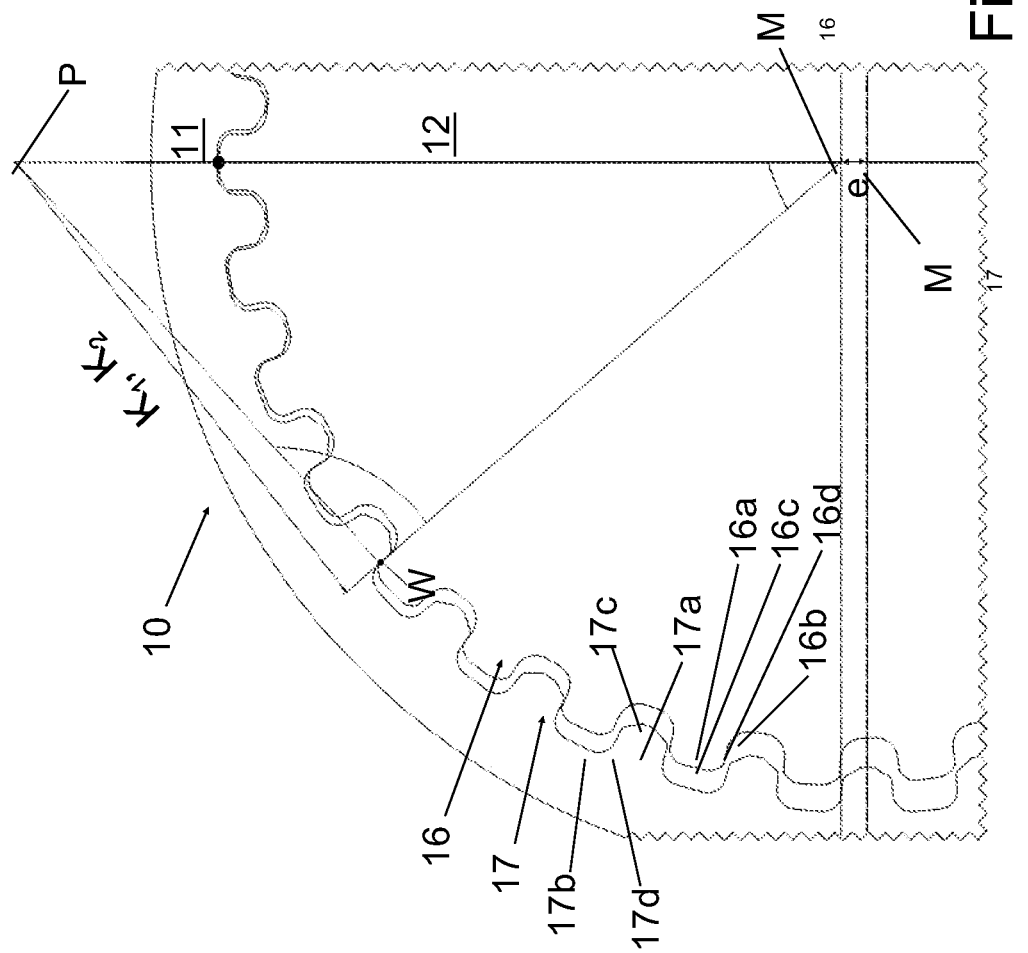
FIG. 1 is a side view of an only partially represented cut through toothed wheel and toothed ring of the exemplary embodiment.
Figure 4:
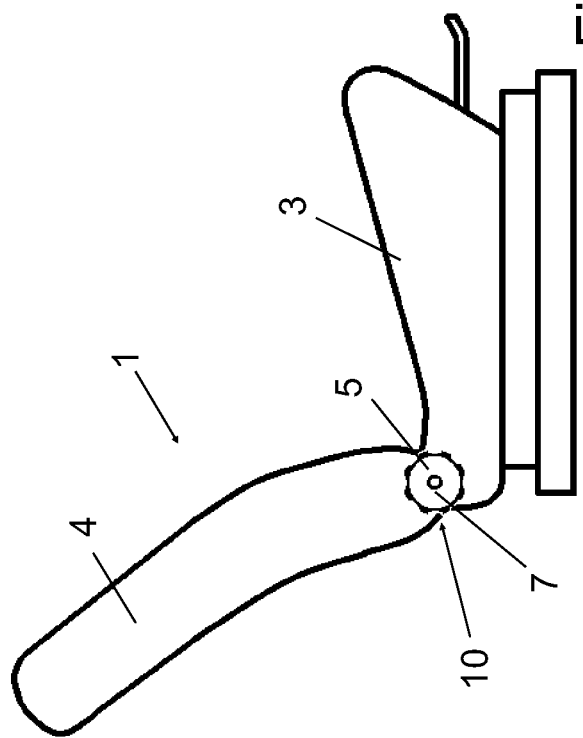
FIG. 4 is a schematic representation of a vehicle seat according to the invention.
Figure 2:
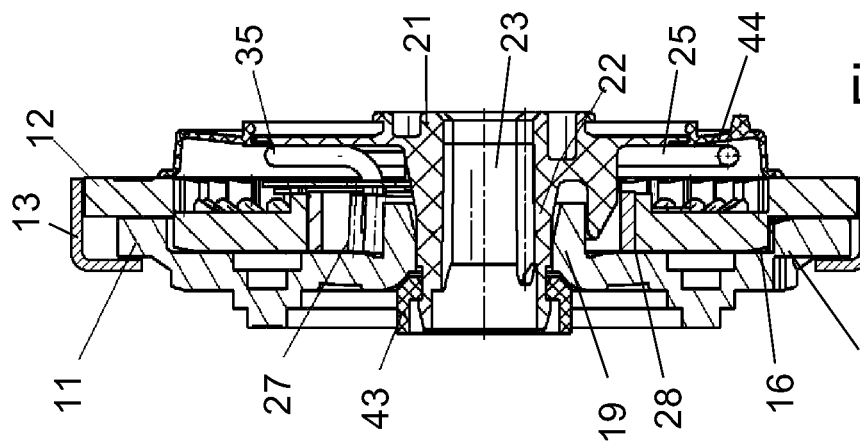
FIG. 2 is an axial cut through view of the exemplary embodiment.
Figure 3:
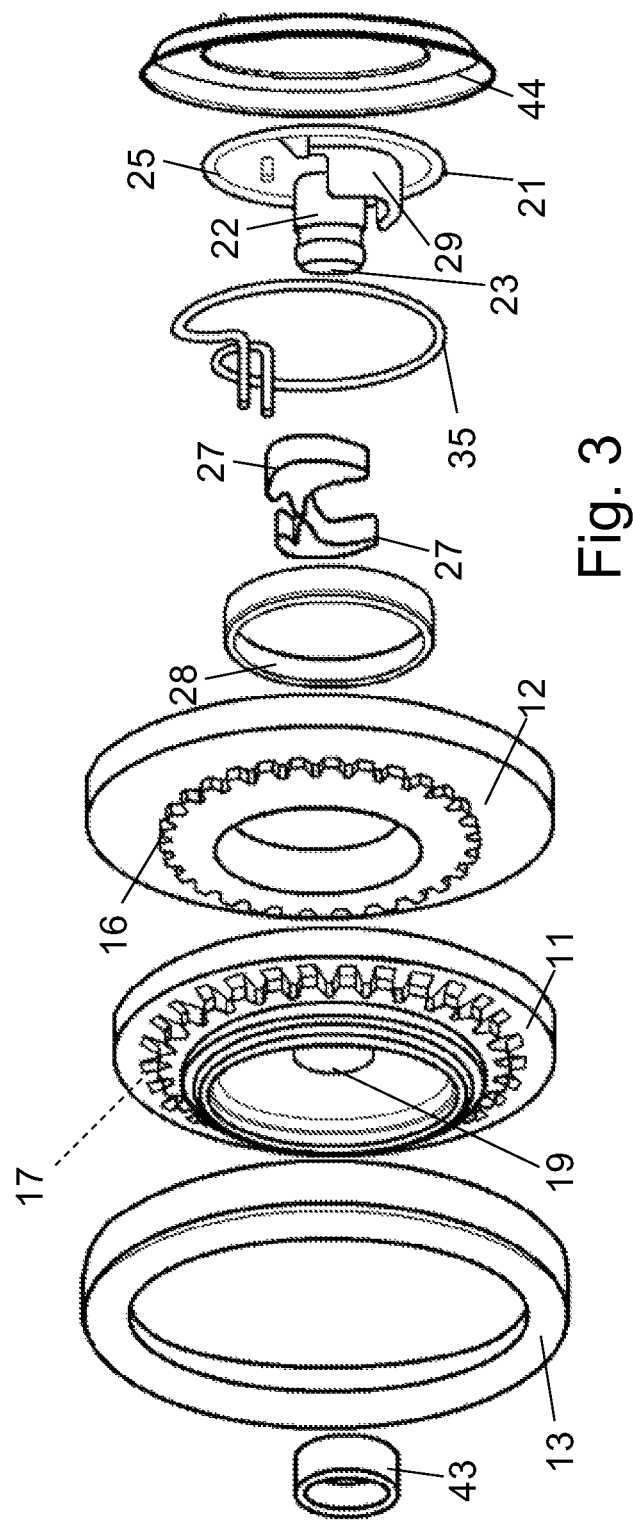
FIG. 3 is an exploded view of the fitting.

Referring to the drawings in particular, a vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure, in a manner which will be described later. The drive shaft 7 defines the adopted directional data of a cylinder coordinate system.

The fitting 10 is in the form of a gear fitting in which a first fitting part 11 and a second fitting part 12 are connected to each other by means of a gear unit for displacement and fixing in position, to be more precise, by means of an eccentric epicyclic gear system, which in the present case is self-locking, as described, for example, in DE 44 36 101 A1, the relevant disclosure of which is expressly incorporated herein (and corresponding U.S. Pat. No. 5,634,689 is hereby incorporated by reference in its entirety).

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 are preferred when the drive shaft 7 and the backrest 4 are to have the same direction of rotation, or when the position of the drive shaft 7 relative to the backrest 4 is to be constant in order, for example, to be able to fit to the structure of the backrest 4 an electrical motor rotating the drive shaft 7. However, the assignments of the fitting parts 11 and 12 can also be exchanged, i.e. the first fitting part 11 would then be fixed with respect to the seat part and the second fitting part 12 would be fixed with respect to the backrest. The latter assignments of the fitting parts 11 and 12 are preferred when the radial spacings of the fastening points between the fitting 10 and a relatively thin metal backrest sheet are to be as large as possible.

Each of the two fitting parts 11 and 12 can be approximately inscribed in a circular disk shape. The two fitting parts 11 and 12 are preferably composed of metal, in particular steel. In order to absorb the axially acting forces, i.e. in order to hold the fitting parts 11 and 12 together, an enclosing ring 13 is provided. Such a method of holding parts together by means of an enclosing ring is described, for example, in U.S. Pat. No. 6,799,806 A, the relevant disclosure of which is expressly incorporated herein. The preferably metal enclosing ring 13 is, with the mounting of the fitting 10, connected tightly to the second fitting part 12, being preferably first of all pressed on and then welded. Alternatively, the enclosing ring 13 is beaded, engaging over the second fitting part 12. At one of its end faces, the enclosing ring 13 has an edge bent radially inwards by means of which it engages radially over the outside of the first fitting part 11, optionally with the interposition of a sliding ring, without impeding the relative movement of the two fitting parts 11 and 12. From a structural point of view, the two fitting parts 11 and 12 therefore together form a disk-shaped unit.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth (of the toothed ring 17) than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16.

On the side facing the toothed wheel 16, the first fitting part 11 has, concentrically with the toothed ring 17, a collar 19 which can be integrally formed on (i.e. formed in one piece with) the first fitting part 11 as a collar formation or which can be secured thereto in the form of a separate sleeve. A driver 21 is supported rotatably in the collar 19 by means of a hub 22. The driver 21 is preferably composed of plastic material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disk 25 which is formed in one piece with the hub 22 and which has a larger diameter than the hub.

Supported on the collar 19 (with their curved inner surfaces) are two wedge segments 27 which support (with their curved outer surfaces) the second fitting part 12 by means of a slide bearing bush 28 which is pressed into the second fitting part 12 in a rotationally secure manner. The driver 21 has—spaced radially from the hub 22—a driver segment 29 which engages with clearance between the narrow sides of the wedge segments 27 and which is formed in one piece with the covering disk 25 and the hub 22. The mutually facing broad sides of the wedge segments 27 each receive, with a respective recess defined by projecting sections of material, a respective angled end finger of an omega spring 35 which presses the wedge segments 27 apart in the circumferential direction, it being possible during operation for the projecting material sections of the wedge segments 27 to touch and act on each other.

The driver 21 is secured axially to the outside of the first fitting part 11 by a clipped-on securing ring 43. Provided on the outside of the second fitting part 12, between the radially outer edge thereof and the covering disk 25, is a sealing ring 44 which is composed, for example, of rubber or soft plastic material and which is connected, especially clipped, to the covering disk 25.

The wedge segments 27 (and the omega spring 35) define an eccentric which, in extension of the direction of eccentricity (i.e. the line connecting the axes), presses the toothed wheel 16 into the toothed ring 17 at an engagement site so defined. When drive is effected by means of the rotating drive shaft 7, a torque is first of all transmitted onto the driver 21 and then, by means of the driver segment 29, onto the eccentric which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

Depending on the mounting of the fitting 10, the eccentric (i.e. the wedge segments 27) is supported by the second fitting part 12, while the eccentric, for its part, supports the first fitting part 11, or the relationships are exactly reversed, i.e. the eccentric rests on the first fitting part 11 and supports the second fitting part 12.

Each of the—in the present case thirty three—teeth 16a of the toothed wheel 16 has radially inward on both sides a tooth root 16b, radially outward a tooth tip 16c and, between them on both sides, one tooth flank 16d each. The tip circle circumscribing the tooth tips 16c and the root circle inscribed by the tooth roots 16b are concentrical, in the present case to the receptacle for the eccentric, such receptacle being coated with the slide bearing bush 28, a center point $M_{16}$ and a radial orientation (in cylinder coordinates) of the toothed wheel 16 thus being defined.

The course of two adjacent tooth roots 16b results, for example, from a radius (quarter arc) of approximately 1 mm, adjoining the one tooth flank 16d (continuous and differentiable), a straight piece of 1 to 2 mm which is adjacent tangentially to the root circle, and a mirror-symmetrical radius (quarter arc) of approximately 1 mm, which is adjoining the next tooth flank 16d. The tooth roots 16b merge in the point of contact to the root circle (radius for example approximately 31 mm). The course of a tooth tip 16c results, for example, from a radius (quarter arc) of approximately 1 mm, adjoining the one tooth flank 16d (continuous and differentiable), a tangential piece of 1 to 2 mm and a mirror-symmetrical radius (quarter arc) of approximately 1 mm, which is adjoining the other tooth flank 16d. The tooth tips 16c touch the tip circle (radius, for example, approximately 34 mm) at their radially outermost point.

Correspondingly, each of the—in the present case thirty-four—teeth 17a of the toothed ring 17 has a tooth root 17b, a tooth tip 17c and two tooth flanks 17d. The tip circle which is inscribed by the tooth tips 17c and the root circle which circumscribes the tooth roots 17b are concentrical, in the present case with respect to the collar 19, thus defining a center point $M_{17}$ and a radial orientation (in cylinder coordinates) of the toothed ring 17. The courses of the tooth roots 17b and of the tooth tips 17c preferably correspond to those of the tooth roots 16b and of the tooth tips 16c. The straight piece which bears against the root circle (radius for example approximately 36 mm) can be a little longer than that of the toothed wheel 16. The radius at the tooth tip 17c can be a little larger than that of the tooth tip 16c, resulting in the piece adjoining the tip circle (radius, for example, approximately 33 mm) being a little shorter than with the toothed wheel 16. The tooth roots of adjacent teeth 17a merge in their point of contact with the root circle (their radially outermost point), thus defining the tooth base enclosed by them. The tooth tips 17c touch the tip circle at their radially inmost point. The eccentricity e (of the eccentric) is the distance between the center point $M_{17}$ of the toothed ring 17 and the center point $M_{16}$ of the toothed wheel 16. It amounts, for example to 1 to 2 mm.

It results from the exact configuration of the teeth 16a and 17a, how the teeth 16a, 17a can come into contact, in particular along which contact lines and contact surfaces. In the pole toothing of the present embodiment, the tooth flanks 16d and 17d—subsequently at one pitch point W each—get to bear against one another, i.e. they serve for the rolling movement, while the tooth tips 16c, 17c, and the tooth roots 16b, 17b can be configured independently of this. When the fitting 10 is driven, that is to say during the rolling movement, the pitch point W is not exactly in the extension of the eccentricity e, but—relative to the center point $M_{16}$ of the toothed wheel 16—it is at a first angle $\alpha$ of 10° to 50°, in particular approximately 45°, over the extension of the eccentricity e. The contact of these tooth flanks 16d and 17d at the pitch point W has the same effect as if the toothed wheel 16 and the toothed ring 17 rotated relative to one another around an instantaneous center of rotation P. The first angle $\alpha$ depends on the shape of the wedge segments 27, in particular of the wedge angle, and of their position during the rolling movement. With respect to the extension of the eccentricity e, a further pitch point occurs on the side opposing pitch point W, so that the toothed wheel 16 is supported, i.e. stabilized at three points (eccentric and the two pitch points).

The instantaneous center of rotation P is, in every case, in the extension of the eccentricity e. Moreover, the instantaneous center of rotation P—with respect to the pitch point W—is located at a second angle $\beta$ of 80° to 100°, in particular approximately 90°, with respect to the straight line connecting the pitch point W and the center point $M_{16}$ of the toothed wheel 16. The toothed flanks 16d and 17d are configured as circular-arc pieces around the instantaneous center of rotation P, i.e. the center point of their curvature is the same point, namely the instantaneous center of rotation P, and the (constant) radius of curvature $K_1$ of the tooth flank 16d and the (constant) radius of curvature) $K_2$ of the tooth flank 17d are identical as well (for example approximately 33 mm).

The identical radius of curvature $K_1 = K_2$ for the tooth flanks 16d and 17d is an ideal radius of curvature for perfectly worked teeth 16a and 17a. In practice, there are tolerances in production. To compensate them, it is advantageous, if the actual radius of curvature $K_2$ of the tooth flank 17d is slightly smaller and/or the actual radius of curvature $K_1$ of the tooth flank 16d is slightly larger than the ideal radius of curvature, i.e. the radius of curvature $K_1$ of the tooth flank 16d at the pitch point W and the radius of curvature $K_2$ of the tooth flank 17d at the pitch point W are (only) at least approximately identical. Since the tooth flanks 16d, 17d are only very short circular-arc pieces it can be sensible—depending on the production tolerances—that the actual radii of curvature $K_1$, $K_2$ of the tooth flanks 16d, 17d are within a range of ±10%, preferably ±4%, particularly preferably ±1%, each time, for example, referred to their common mean value $(K_1+K_2)/2$. The named ranges are consequently considered to be still approximate. Preferably, both centers of curvature are located on the straight line connecting pitch point W and the instantaneous center of rotation P.

While specific embodiments of the invention have been described in detail to illustrate the application of the principles of the invention, it will be understood that the invention may be embodied otherwise without departing from such principles.

The invention claimed is:

1. A fitting for a motor vehicle seat, the fitting comprising: a first fitting part on which is formed a toothed ring; a second fitting part on which is formed a toothed wheel which meshes with the toothed ring, as a result of which the two fitting parts are in gear connection with each other; a rotatably supported circumferential eccentric; a driver, the eccentric being driven by the driver for driving a relative rolling movement of the toothed wheel and the toothed ring, wherein, during this rolling movement, at one pitch point, a tooth flank of a tooth of the toothed wheel bears against a tooth flank of a tooth of the toothed ring, wherein a radius of curvature of the tooth flank of the tooth of the toothed wheel at the pitch point and the radius of curvature of the toothed flank of the tooth of the toothed ring at the pitch point are at least approximately identical, wherein the relative rolling movement of said toothed wheel and said toothed ring at the pitch point defines an instantaneous center of rotation of a relative rotation movement, wherein the toothed flanks of the toothed ring and the toothed wheel are configured as circular arc pieces, wherein the center point of the circular arc piece of the toothed ring and the center point of the circular arc piece of the toothed wheel is the same point, the same point being the instantaneous center of rotation.

2. A fitting according to claim 1, wherein the radii of curvature of the tooth flanks of the teeth of the toothed wheel and of the toothed ring, such tooth flanks bearing against one another at the pitch point, are constant, said common mean value corresponding to an average of said radius of said curvature of said tooth flank of said toothed ring and said radius of curvature of said tooth flank of said toothed wheel.

3. A fitting according to claim 1, wherein the centers of curvature of the tooth flanks of the teeth of toothed wheel and toothed ring, such tooth flanks bearing against one another at the pitch point, are located on a straight line connecting pitch point and the instantaneous center of rotation.

4. A fitting according to claim 3, wherein the instantaneous center of rotation is a respective center of curvature of the tooth flanks of the teeth of toothed wheel and toothed ring, such tooth flanks bearing against one another at the pitch point.

5. A fitting according to claim 1, wherein an eccentricity is defined as distance between a center point of the toothed ring and a center point of the toothed wheel.

6. A fitting according to claim 1, wherein:
the relative rolling movement of toothed wheel and toothed ring defines, at the pitch point, the instantaneous center of rotation of a relative rotation movement;
an eccentricity is defined as a distance between a center point of the toothed ring and a center point of the toothed wheel;
the instantaneous center of rotation is located in an extension of the eccentricity.

7. A fitting according to claim 5, wherein the pitch point, with respect to a center point of the toothed wheel, is at a first angle over the extension of the eccentricity.

8. A fitting according to claim 7, wherein the first angle amounts to 10° to 50°.

9. A fitting according to claim 1, wherein the instantaneous center of rotation with respect to the pitch point is a second angle over the straight line connecting the pitch point and the center point of the toothed wheel.

10. A fitting according to claim 9, wherein the second angle amounts to 80° to 100°.

11. A vehicle seat comprising:
a seat part;
a backrest; and
a fitting, the inclination of the backrest being adjusted by means of the fitting, the fitting comprising:
a first fitting part with a toothed ring;
a second fitting part with a toothed wheel which meshes with the toothed ring to provide a gear connection;
a rotatably supported circumferential eccentric;
a driver, the eccentric being driven by the driver for driving a relative rolling movement of the toothed wheel and the toothed ring, wherein during said rolling movement a tooth flank of a tooth of the toothed wheel bears against a tooth flank of a tooth of the toothed ring at a pitch point and a radius of curvature of the tooth flank of the tooth of the toothed wheel at the pitch point and a radius of curvature of the toothed flank of the tooth of the toothed ring at the pitch point are approximately identical, wherein the relative rolling movement of the toothed wheel and the toothed ring at the pitch point defines an instantaneous center of rotation of a relative rotation movement, toothed flanks of the toothed ring and the toothed wheel are configured as circular arc pieces, wherein the center point of the circular arc piece of the toothed ring and the center point of the circular arc piece of the toothed wheel is the same point, the same point being the instantaneous center of rotation.

12. A vehicle seat according to claim 11, wherein:
the radius of curvature of the tooth flank of the tooth of the toothed wheel and the radius of curvature of the toothed flank of the tooth of the toothed ring are constant; and
centers of curvature of the tooth flanks of the teeth of the toothed wheel and of the tooth flanks of the teeth of the toothed ring are located on a straight line connecting the pitch point and the instantaneous center of rotation, said common mean value corresponding to an average of said radius of said curvature of said tooth flank of said toothed ring and said radius of curvature of said tooth flank of said toothed wheel.

13. A vehicle seat fitting for adjustment of a backrest, the fitting comprising:
a first fitting part with a toothed ring;
a second fitting part with a toothed wheel which meshes with the toothed ring to provide a gear connection;
a rotatably supported circumferential eccentric; and
a driver, the eccentric being driven by the driver for driving a relative rolling movement of the toothed wheel and the toothed ring, wherein during said rolling movement a tooth flank of a tooth of the toothed wheel bears against a tooth flank of a tooth of the toothed ring at a pitch point and a radius of curvature of the tooth flank of the tooth of the toothed wheel at the pitch point and a radius of curvature of the toothed flank of the tooth of the toothed ring at the pitch point are approximately identical, wherein the relative rolling movement of the toothed wheel and the toothed ring at the pitch point defines an instantaneous center of rotation of a relative rotation movement, wherein said toothed flanks of the toothed ring and the toothed wheel are configured as circular arc pieces, wherein the center point of the circular arc piece of the toothed ring and the center point of the circular arc piece of the toothed wheel is the same point, the same point being the instantaneous center of rotation.

14. A fitting according to claim 13, wherein the radius of curvature of the tooth flank of the tooth of the toothed wheel and the radius of curvature of the toothed flank of the tooth of the toothed ring are constant, said common mean value corresponding to an average of said radius of said curvature of said tooth flank of said toothed ring and said radius of curvature of said tooth flank of said toothed wheel.

15. A fitting according to claim 14, wherein:
centers of curvature of the tooth flanks of the teeth of the toothed wheel and of the tooth flanks of the teeth of the toothed ring are located on a straight line connecting the pitch point and the instantaneous center of rotation.

16. A fitting according to claim 15, wherein the instantaneous center of rotation is the center of curvature of each of the tooth flanks of the teeth of the toothed wheel and of the tooth flanks of the teeth of the toothed ring.

17. A fitting according to claim 13, wherein:
an eccentricity is defined as a distance between a center point of the toothed ring and a center point of the toothed wheel; and
the instantaneous center of rotation is located in an extension of the eccentricity.

18. A fitting according to claim 17, wherein the pitch point, with respect to a center point of the toothed wheel, is at an angle with respect to the extension of the eccentricity between 10° to 50°.

19. A fitting according to claim 17, wherein the instantaneous center of rotation with respect to the pitch point is at a second angle with respect to a straight line connecting the pitch point and the center point of the toothed wheel.

20. A fitting according to claim 19, wherein the second angle is 80° to 100°.

* * * * *